3,201,302
HEAT SEALING OF POLYOLEFIN FILMS
Robert F. Williams, Jr., Billy R. Dotson, and Raymond T. Jones, Rochester, N.Y., assignors to Eastman Kodak Company, Rochester, N.Y., a corporation of New Jersey
No Drawing. Filed Dec. 8, 1960, Ser. No. 74,452
6 Claims. (Cl. 161—252)

This invention concerns heat sealing polyolefin thermoplastics. More specifically, it relates to wet heat sealing of polyolefin films and sheeting to obtain clear, transparent, vapor-proof seals.

The use of heat in effecting a seal between contacting surfaces has been of great importance in view of the ease and speed with which packages can be sealed. Heat sealing normally avoids the use of sticky glues or pastes. Moreover, in the case of wax paper, the potentially adhesive material covers the entire package so that any portion which is folded or used as a flap can be made to adhere readily to another surface using heat. In addition, a heat seal in a wax coated paper can be opened readily and made relatively tight merely by refolding.

In order to use this sealing method for cellophane sheeting, the sheeting has been coated with a suitable heat sealable material.

Polyolefins, however, have presented difficulties in packaging which have made them unsatisfactory for sealing in many packaging utilizations. For instance, the heat sealing temperature for polyolefins has normally been the tacking temperature at which temperature the polyolefin tends to stick to the heater bars or to the hot wheels which are used to apply heat to the polyolefin to be sealed. The high heat necessary requires temperature control which is frequently not practical. Moreover, there may be polyolefin exuded from the pressure source and increased haze in the sealed area.

In some thermoplastic packaging materials the electrical properties have been such that high frequency sealing of the films and sheeting could be used. However, due to the properties of polyolefins which made them especially suitable for packaging purposes, these materials are not adaptable to high frequency sealing.

Solvent sealing of certain thermoplastic materials such as cellulose esters has been found to be satisfactory, but the chemical properties of polyolefins are such that solvent sealing has not been practical.

In addition to the above difficulties in sealing polyolefins, there has been a desirability in the packaging industry to have a heat seal which is similar to that obtained with wax paper or cellophane and which can be opened easily and refolded. The customary heat seal obtained with polyolefin sheeting has required a tear strip which effectively destroyed the polyolefin package.

We have found a method of heat sealing polyolefins using temperatures less than the tack temperature of the polyolefin by employing certain wet coatings on the polyolefin prior to the heat sealing step.

One object of this invention is to provide a process for heat sealing polyolefin sheeting at temperatures lower than the tack temperature of the polyolefin. Another object of this invention is to provide heat seals in polyolefin sheeting which are readily opened without requiring a tear strip. A further object is to provide sealing aids which can be employed for heat sealing polyolefin sheeting at temperatures below the boiling points of the sealing aids. A further object is to provide sealing aids which are not readily absorbed by the polyolefins at temperatures below the tack temperature of the polyolefins. An additional object is to provide heat seals of polyolefin sheeting which are not hazy in the sealed areas.

The above objects are obtained by wetting the surface of the polyolefin at the point where the seal is desired with a thin coating of an organic sealing aid. The surface merely needs to be moistened so that the layer of sealing aid may be applied using any of the usual coating means for applying a thin layer of the sealing aid. For instance, the sealing aid may be wicked onto the polyolefin, applied by a kiss roll, hopper, or the like.

The organic liquids which are intended to be within the scope of the term sealing aids are the high boiling halogenated members of the paraffin and olefin series such as carbon tetrachloride, trichloroethylene, propylene dichloride, dichlorobutane, 1,1-dichloro-2-methyl-propane and tetramethylene dichloride, aromatic compounds such as toluene, xylene, and naphthalene, decalins, tetralin, and the like.

The heat which is required to obtain a heat seal after the polyolefin has been moistened with a sealing aid is from 20 to 30° less than the tack temperature of the polyolefin. Polyolefins which are operative in our invention are those prepared from $\alpha$-olefins having from 2–10 carbon atoms and include copolymers and blends of these poly-$\alpha$-olefins.

We have found that compression rolled polyolefins are our preferred packaging material for heat sealing according to this process. Compression rolled polyolefins are intended to be those described in abandoned applications Serial Nos. 831,879, filed August 5, 1959; 833,666, filed August 10, 1959; 9,567, filed February 18, 1960; and 16,208, filed March 21, 1960. These compression rolled polyolefin films are obtained by heating the polyolefin to form a clear melt, forming into a translucent sheet 2–10 times the thickness desired in the finished sheet, and obtaining a transparent final sheet by passing the translucent sheet between rollers under sufficient pressure to reduce the thickness to ½ to ⅒ that of the translucent sheet.

The following examples are intended to illustrate our invention but not to limit it in any way.

*Example 1*

The tack temperature of a one mil polyethylene film having a density of 0.952 g./cc. and prepared by the compression roll process was determined. Strips of this film were then sealed together at the temperature indicated by wicking a thin film of the indicated organic compounds onto one of the surfaces to be sealed.

| Sealing Aid | Tack Temperature, °F. | Sealing Temperature, °F. |
|---|---|---|
| None | 245 | 245 |
| Xylene | 245 | 225 |
| Propylene dichloride | 250 | 230 |
| Naphthalene | 250 | 220 |
| 1,1,1-trichloroethane | 250 | 230 |
| 1,1,2-trichloroethane | 250 | 225 |

The sealing aids are effective in lowering the sealing temperature below the tack temperature of the film. When the tack temperature is above the sealing temperature, it is possible to bring the outside surface of the film into contact with the heating source without the film sticking to the heating medium or developing holes.

Example 2

The effectiveness of a sealing aid on polyethylene films from resins of different density is shown as follows:

| Resin Density, g./cc. | Tack Temp., °F. | Heat Sealing Temperature | |
|---|---|---|---|
| | | No Sealing Aid, °F. | Xylene as Sealing Aid, °F. |
| 0.920 (as extruded) | 210 | 210 | 205 |
| 0.920 (compression rolled) | 210 | 210 | 190 |
| 0.930 (as extruded) | 225 | 225 | 190 |
| 0.930 (compression rolled) | 225 | 225 | 185 |
| 0.955 (as extruded) | 250 | 250 | 220 |
| 0.955 (compression rolled) | 250 | 250 | 220 |

Example 3

Cardboard boxes 2⅞″ x 2½″ x 1⅜″ containing Kodak Universal M-Q Developer were overwrapped and sealed in medium and high density polyethylene films. A thin film of xylene was brushed on the interface of the films in the area to be sealed just before the overwrapped boxes were slid over a chromium-plated bar heated to the indicated temperature.

Overwrap: Sealing-bar temperature, °F.
- Medium density as extruded _____ 190
- Medium density rolled _____ 190
- High density as extruded _____ 210
- High density rolled _____ 210

Seals on the films prepared from the medium and high density polyethylene by the compression rolling process were free of wrinkles and distortion. There was some evidence in the seals of the asextruded medium and high density films of slight wrinkling and distortion but this was not sufficient to be an objection in most overwrap applications.

Example 4

The effectiveness of these seals as moisture barriers was determined by filling boxes like those described in Example 3 with anhydrous $CaSO_4$, then overwrapping with high density polyethylene films prepared by the compression roll process. These films were sealed by the technique described in Example 3. The overwrapped and sealed boxes were stored under atmospheric conditions and the gain in weight determined as an indication of moisture permeability of the film and seal. After eight days, three individual specimens had shown the following percent gain in weight.

Percent weight gain
- Box No. 1 _____ 0.1
- Box No. 2 _____ 0.1
- Box No. 3 _____ 0.1

Polyolefins of various densities can be used including low, medium, and high density. Various thicknesses of polyolefin sheeting may also be used.

It will also be apparent that polyolefin coatings on various substrates can be heat sealed using this method. Moreover, in some instances, a wet coating of the heat sealing aid on one surface to be sealed may be sufficient, although in our preferred embodiment the liquid would be applied to both surfaces.

The invention has been described in detail with particular reference to preferred emobdiments thereof, but it will be understood that variations and modifications can be effected within the spirit and scope of the invention as described hereinabove and as defined in the appended claims.

We claim:

1. A process for heat sealing comprising moistening at least one surface of compression rolled polyolefin sheet with a sealing aid selected from the group consisting of carbon tetrachloride, chloroethylene, propylene dichloride, dichlorobutane, 1,1-dichloro-2-methyl propane, tetramethylene dichloride, toluene, xylene, decalin, and tetralin, placing said moistened surface in contact with a second surface of compression rolled polyolefin sheet with said sealing aid disposed therebetween, and heating said surfaces to a sealing temperature below the tack temperature of the polyolefin.

2. A bonded article comprising at least two surfaces of compression rolled polyolefin sheet material heat sealed together with a sealing aid selected from the group consisting of carbon tetrachloride, chloroethylene, propylene dichloride, dichlorobutane, 1,1-dichloro-2-methyl propane, tetramethylene dichloride, toluene, xylene, decalin, and tetralin.

3. A process for heat sealing comprising moistening at least one surface of compression rolled polyethylene sheet with a sealing aid selected from the group consisting of carbon tetracholoride, chloroethylene, propylene dichloride, dichlorobutane, 1,1-dichloro-2-methyl propane, tetramethylene dichloride, toluene, xylene, decalin, and tetralin, placing said moistened surface in contact with a second surface of compression rolled polyethylene sheet with said sealing aid disposed therebetween, and heating said surfaces to a sealing temperature below the tack temperature of the polyethylene.

4. A bonded article comprising at least two surfaces of compression rolled polyethylene sheet material heat sealed together with a sealing aid selected from the group consisting of carbon tetrachloride, chloroethylene, propylene dichloride, dichlorobutane, 1,1-dichloro-2-methyl propane, tetramethylene dichloride, toluene, xylene, decalin, and tetralin.

5. A process for heat sealing comprising moistening at least one surface of compression rolled polypropylene sheet with a sealing aid selected from the group consisting of carbon tetrachloride, chloroethylene, propylene dichloride, dichlorobutane, 1,1-dichloro-2-methyl propane, tetramethylene dichloride, toluene, xylene, decalin, and tetralin, placing said moistened surface in contact with a second surface of compression rolled polypropylene sheet with said sealing aid disposed therebetween, and heating said surfaces to a sealing temperature below the tack temperature of the polypropylene.

6. A bonded article comprising at least two surfaces of compression rolled polypropylene sheet material heat sealed together with a sealing aid selected from the group consisting of carbon tetrachloride, chloroethylene, propylene dichloride, dichlorobutane, 1,1-dichloro-2-methyl propane, tetramethylene dichloride, toluene, xylene, decalin, and tetralin.

References Cited by the Examiner

UNITED STATES PATENTS

| | | |
|---|---|---|
| 2,343,975 | 3/44 | Hosfield. |
| 2,384,848 | 9/45 | Peters. |
| 2,476,282 | 7/49 | Castellan. |
| 2,849,359 | 8/58 | Smith. |
| 2,899,713 | 8/59 | Lundsager. |
| 2,927,047 | 3/60 | Schulde. |

FOREIGN PATENTS 765,904  1/57  Great Britain.

ALEXANDER WYMAN, *Primary Examiner.*
EARL M. BERGERT, *Examiner.*